(No Model.)
M. W. FARBER.
PLOW CUTTER.
No. 250,139.　　　　　　　　　　Patented Nov. 29, 1881.
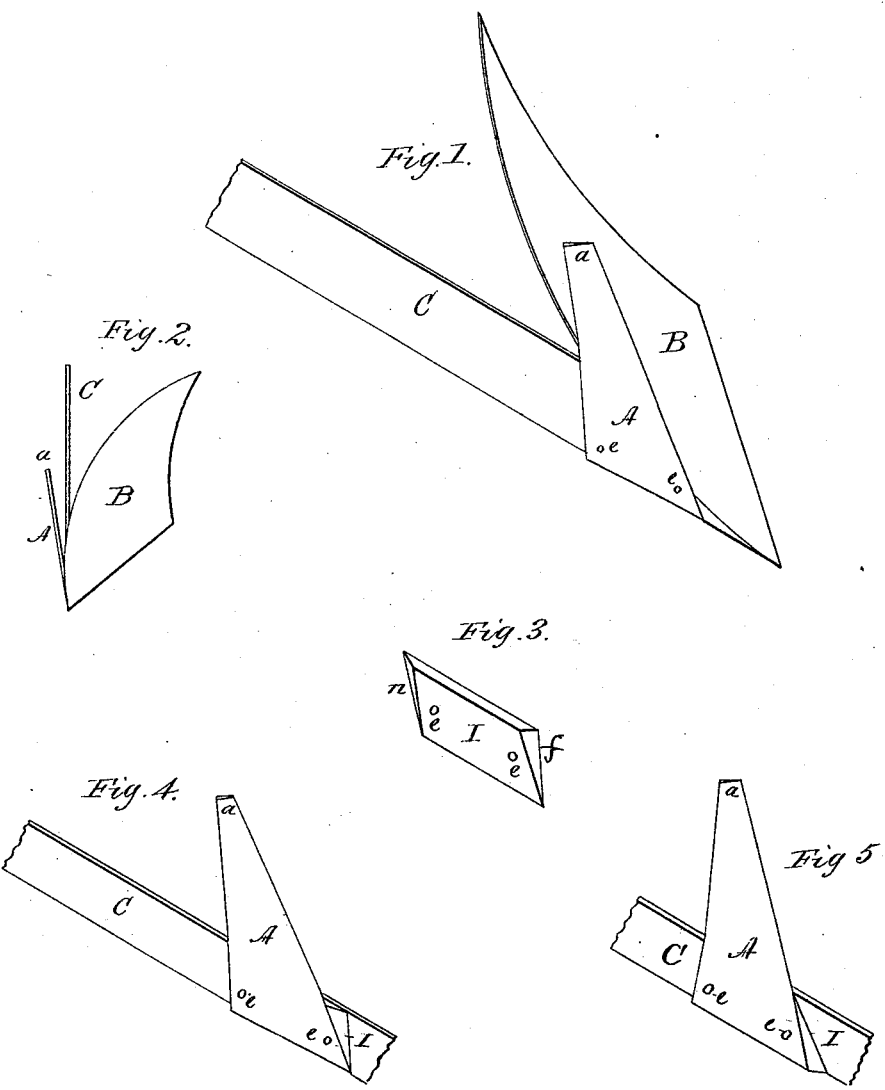
Witnesses.　　　　　　　　　　Inventor.
Will C. Garman　　　　　　　Manasseh W. Farber
J. H. Warren　　　　　　　　Per J. T. Drummond,
　　　　　　　　　　　　　　　　Atty.

UNITED STATES PATENT OFFICE.

MANNASSEH W. FARBER, OF HENRY COUNTY, IOWA.

PLOW-CUTTER.

SPECIFICATION forming part of Letters Patent No. 250,139, dated November 29, 1881.

Application filed June 30, 1881. (No model.)

*To all whom it may concern:*

Be it known that I, MANNASSEH W. FARBER, a citizen of the United States, residing in the county of Henry and State of Iowa, have invented a new and useful Improvement in Plow-Cutters, of which the following is a specification.

My invention relates to an improvement in constructing plow-cutters so that they may be adjusted and fastened on the bar of any plow, for any purpose for which a plow-cutter is used.

I am aware that cutters have been attached to the bar of plows in different ways, so as to make upward vertical cuts, and that cutters have been adjustably attached to the beam of plows in such a way that their cutting-edge is permitted to be adjusted laterally by using wedges or other devices for said purpose; but in said adjustments the pivotal axis of the cutter is vertical, and the adjustments are made to cause the plow to take more or less to land, and the edges of the sod are cut square.

The object of my invention is to provide a plow-cutter that may be attached by bolting it to the landside of the bar of any ordinary plow, so that it will not only cut and separate the dirt or sod entirely from the bottom of the furrow, but also to have it adjustable laterally, the pivotal axis of its adjustments being at the bottom of the cutter, so as to set it with its top leaning (more or less, as the nature of the ground may require) inward or to land, so as to cut the edges of the sod sloping, with its lower outer corner (before being turned) forming an acute angle, thereby being in better shape for falling over from the mold-board of a plow than if the edges were cut square. This method of cutting also prevents pieces of the sod from standing on edge or falling back with grass side up in the furrow from whence they were cut.

My invention consists of a steel cutter-blade adjustably fastened to the landside of the bar of a plow at or near the junction of the point of the mold-board with the share, having its cutting-edge sloping backward and slightly bent sidewise, so that its top end will lean inward or to land about one inch from a perpendicular with the bottom of the plow. A reversible wedge is also provided that may be inserted between the cutter and the bar of the plow to which it is fastened, for the purpose of varying laterally the sloping angle of the cutter, making the slope greater when breaking stiff sod than otherwise, by inserting the wedge with the thick edge upward, or reducing said angle to nearly a plumb cut for plowing in old or loose ground by inserting said wedge in an inverted position, thus accommodating the angle of slope to all the varied requirements.

In the accompanying drawings, embodying my invention, having similar letters of reference indicating like parts in all, Figure 1 is a perspective showing the cutter A attached, as viewed from the land side. Fig. 2 is a front view of the same. Fig. 3 is a reversible wedge for varying the angle of slope by placing it between the cutter A and the bar of the plow C. Fig. 4 represents the wedge I inserted so as to throw the top *a* of the cutter A farther inward or to land than in Figs. 1 and 2; and Fig. 5 represents the wedge I inserted in an inverse manner, so as to reduce the angle of slope to nearly a perpendicular. The wedge I has its ends *f* and *n* inclined, as shown, so as to cause the dirt to glide past said ends and the cutter without clogging.

B represents the mold-board of the plow, and *e* the holes in the different parts for fastening all together by means of bolts.

Having thus fully described my invention, what I claim as new, and desire to secure by Letters Patent, is—

1. In combination with the bar C of a plow, the removable cutter A, fastened to the outside of the bar C, its cutting-edge extended upward and sloped slightly backward, and adapted to be adjusted inward or to land, as shown and described, and for the purposes specified.

2. In combination with the removable and adjustable cutter A and the bar C, the reversible wedge I, adapted to be used, as described, between the bar C of a plow and the lower end of the cutter A.

MANNASSEH W. FARBER.

Witnesses:
 WM. I. BOBB,
 JNO. S. WOOLSON.